US012565123B2

(12) United States Patent
Nelapati et al.

(10) Patent No.:  US 12,565,123 B2
(45) Date of Patent:       Mar. 3, 2026

(54) VEHICLE SYSTEMS AND CABIN RADAR CALIBRATION METHODS

(71) Applicant: GM GLOBAL TECHNOLOGY OPERATIONS LLC, Detroit, MI (US)

(72) Inventors: Praneeth Nelapati, Novi, MI (US); Jeffrey A Clark, Macomb Township, MI (US); George D Allen, Rochester Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 293 days.

(21) Appl. No.: 18/342,117

(22) Filed: Jun. 27, 2023

(65) Prior Publication Data

US 2025/0001906 A1      Jan. 2, 2025

(51) Int. Cl.
B60N 2/02            (2006.01)

(52) U.S. Cl.
CPC ......... B60N 2/0278 (2023.08); B60N 2/0272 (2023.08); B60N 2210/20 (2023.08)

(58) Field of Classification Search
CPC . B60N 2/0278; B60N 2/0272; B60N 2210/20
USPC .................................................... 701/49, 33.1
See application file for complete search history.

(56) References Cited

U.S. PATENT DOCUMENTS

| | | | | |
|---|---|---|---|---|
| 5,943,295 A * | 8/1999 | Varga | ................... | G06V 40/103 |
| | | | | 367/99 |
| 11,230,293 B2 * | 1/2022 | Gomez | ................... | G01S 13/18 |

| | | | | |
|---|---|---|---|---|
| 2007/0033999 A1 * | 2/2007 | Bothe | ....................... | G06T 7/80 |
| | | | | 250/252.1 |
| 2017/0212215 A1 * | 7/2017 | Hellinger | .............. | G01S 13/931 |
| 2017/0248688 A1 * | 8/2017 | Campbell | ............. | G01S 7/4026 |
| 2018/0052223 A1 * | 2/2018 | Stieff | .................... | G01S 7/4026 |
| 2018/0267620 A1 * | 9/2018 | Mueller | ................. | G01S 7/415 |
| 2020/0033469 A1 * | 1/2020 | Jonas | ..................... | G01S 13/42 |
| 2020/0132812 A1 * | 4/2020 | Dvorecki | .............. | G01S 13/931 |
| 2020/0317207 A1 * | 10/2020 | Sloushch | ............. | G01S 13/536 |
| 2020/0341113 A1 * | 10/2020 | Shen | ................... | G01S 13/931 |
| 2020/0355792 A1 * | 11/2020 | Tang | ..................... | G01S 7/4021 |

(Continued)

FOREIGN PATENT DOCUMENTS

| | | |
|---|---|---|
| DE | 102022114997 A1 | 12/2022 |
| DE | 102021133672 A1 | 6/2023 |

*Primary Examiner* — Manglesh M Patel
(74) *Attorney, Agent, or Firm* — Ingrassia Fisher & Lorenz, LLP | IF&L

(57)                ABSTRACT

Vehicles and related systems and methods are provided for calibrating a sensing arrangement within an interior compartment of the vehicle. One method involves initiating operation of an interior component of the vehicle, obtaining one or more signals from the sensing arrangement within the interior compartment of the vehicle, wherein a characteristic of the one or more signals is influenced by the operation of the interior component, determining a measured position of the interior component based at least in part on the characteristic of the one or more signals, obtaining a reference position associated with the interior component, and determining a calibration offset for a reference axis associated with the sensing arrangement based on a relationship between the measured position and the reference position, wherein subsequent operation of the vehicle is influenced by the calibration offset associated with the sensing arrangement.

17 Claims, 3 Drawing Sheets

(56)     References Cited

U.S. PATENT DOCUMENTS

| | | | |
|---|---|---|---|
| 2021/0056306 A1 | 2/2021 | Hu et al. | |
| 2021/0076971 A1* | 3/2021 | Oloumi | A61B 5/0205 |
| 2022/0373645 A1* | 11/2022 | Travnikar | G01S 13/42 |
| 2023/0194697 A1* | 6/2023 | Enam | G01S 13/865 |
| | | | 342/54 |
| 2023/0278569 A1* | 9/2023 | Caron | G06F 3/04886 |
| | | | 701/36 |
| 2024/0069175 A1* | 2/2024 | Sterling | G01S 7/497 |
| 2024/0104879 A1* | 3/2024 | Jiang | G06V 10/245 |
| 2024/0157853 A1* | 5/2024 | Kunz | B60N 2/0244 |
| 2024/0303862 A1* | 9/2024 | Herman | B62D 15/024 |
| 2025/0035743 A1* | 1/2025 | Lore | G01S 7/4082 |
| 2025/0067581 A1* | 2/2025 | Kim | G01D 21/00 |

* cited by examiner

VEHICLE SYSTEMS AND CABIN RADAR CALIBRATION METHODS

INTRODUCTION

The technical field generally relates to vehicle systems and more particularly relates to using existing features within an interior of a vehicle for radar calibration.

Modern vehicles include various enhanced or advanced features to support a human driver operating a vehicle. Many vehicles are capable of sensing their environment and facilitating vehicle operation. For example, an autonomous vehicle or other vehicle capable of supporting autonomous operating modes senses its environment using sensing devices such as radar, lidar, image sensors, and the like. Vehicle automation has been categorized into numerical levels ranging from Zero, corresponding to no automation with full human control, to Five, corresponding to full automation with no human control. Various automated driver-assistance systems, such as cruise control, adaptive cruise control, and parking assistance systems correspond to lower automation levels, while true "driverless" vehicles correspond to higher automation levels.

In addition to sensing the environment external to the vehicle, modern vehicles are increasingly being developed to include sensing capability for the interior of the vehicle. For example, sensors in the cabin of a vehicle may be employed to determine the number of occupants within the vehicle and the relative location of the occupants within the vehicle to support safety features (e.g., controlling airbag operation, verifying a driver is present to support lower level autonomous operating modes, detecting a vehicle occupant within a parked car, etc.). However, due to variations in manufacturing and assembly in addition to the number of different variables in a real-world environment, the alignment of the in-cabin sensors may vary from vehicle to vehicle while also varying over time. Additional vehicle maintenance or service to address misalignment can be costly, time consuming, and/or otherwise detract from the user experience. Accordingly, it is desirable to provide vehicle systems and methods that are capable of managing misalignment or other anomalous conditions with respect to an in-cabin sensor.

SUMMARY

Apparatus for a vehicle and related methods and vehicle systems are provided. One method of assisting operation of a vehicle using a sensing arrangement within an interior compartment of the vehicle involves initiating, by a control module associated with the vehicle, operation of an interior component of the vehicle, obtaining, by the control module, one or more signals from the sensing arrangement within the interior compartment of the vehicle, wherein a characteristic of the one or more signals is influenced by the operation of the interior component, determining, by the control module, a measured position of the interior component based at least in part on the characteristic of the one or more signals, obtaining, by the control module, a reference position associated with the interior component, and determining, by the control module, a calibration offset for a reference axis associated with the sensing arrangement based on a relationship between the measured position and the reference position, wherein subsequent operation of the vehicle is influenced by the calibration offset associated with the sensing arrangement. In one or more implementations, the subsequent operation of the vehicle involves the control module generating a user notification in a manner that is influenced by the calibration offset associated with the sensing arrangement.

In one or more implementations, the sensing arrangement is a radar, where the reference axis is an antenna boresight associated with the radar and the control module initiates transmission of one or more reference electromagnetic signals by the radar, wherein obtaining the one or more signals involves obtaining one or more reflected electromagnetic signals from the radar responsive to the interior component reflecting the one or more reference electromagnetic signals, wherein the characteristic is a frequency of the one or more reflected electromagnetic signals. In one implementation, the operation of the interior component produces a Doppler shift in the one or more reflected electromagnetic signals. In another implementation, the method involves determining an identification of the interior component based on the one or more reflected electromagnetic signals, wherein obtaining the reference position involves obtaining the reference position associated with the identification of the interior component from a data storage element. In another implementation, initiating the operation of the interior component involves initiating operation of an audio speaker within an interior passenger compartment of the vehicle. In another implementation, initiating the operation of the interior component involves initiating a power seating adjustment of a seat within an interior passenger compartment of the vehicle. In another implementation, initiating the operation of the interior component involves initiating operation of a haptic device within an interior passenger compartment of the vehicle.

A non-transitory computer-readable medium is provided that includes executable instructions that, when executed by a processor, cause the processor to provide a calibration service configurable to initiate operation of an interior component of a vehicle, obtain one or more signals from a sensing arrangement within an interior compartment of the vehicle, wherein a characteristic of the one or more signals is influenced by the operation of the interior component, determine a measured position of the interior component based at least in part on the characteristic of the one or more signals, obtain a reference position associated with the interior component, determine a calibration offset for a reference axis associated with the sensing arrangement based on a relationship between the measured position and the reference position, and thereafter generate a user notification influenced by the calibration offset associated with the sensing arrangement. In one implementation, the sensing arrangement is a radar, wherein the reference axis is an antenna boresight associated with the radar. In one or more implementations, the calibration service is configurable to initiate transmission of one or more reference electromagnetic signals by the radar, wherein obtaining the one or more signals involves obtaining one or more reflected electromagnetic signals from the radar responsive to the interior component reflecting the one or more reference electromagnetic signals, wherein the characteristic is a frequency of the one or more reflected electromagnetic signals. In one implementation, the operation of the interior component produces a Doppler shift in the one or more reflected electromagnetic signals. In another implementation, the interior component is an audio speaker within an interior passenger compartment of the vehicle. In another implementation, initiating the operation of the interior component involves initiating a power seating adjustment of a seat within an interior passenger compartment of the vehicle. In another implementation, initiating the operation of the interior component involves initiating operation of a haptic device within an interior passenger compartment of the vehicle.

An apparatus for a vehicle is also provided. The vehicle includes a radar within an interior passenger compartment of the vehicle, an interior component within the interior passenger compartment, and a controller coupled to the radar and the interior component that, by a processor, is configurable to initiate operation of the interior component, initiate transmission of one or more reference electromagnetic signals by the radar concurrent to the operation of the interior component, obtain one or more reflected electromagnetic signals from the radar responsive to the interior component reflecting the one or more reference electromagnetic signals, wherein a characteristic of the one or more reflected electromagnetic signals is influenced by the operation of the interior component, determine a measured position of the interior component based at least in part on the characteristic of the one or more reflected electromagnetic signals, obtain a reference position associated with the interior component, determine a calibration offset for a reference axis associated with the radar based on a relationship between the measured position and the reference position, and thereafter provide a user notification that is influenced by the calibration offset. In one implementation, the interior component is an audio speaker. In another implementation, the interior component is a vehicle seat having power seating functionality.

BRIEF DESCRIPTION OF THE DRAWINGS

The exemplary aspects will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding introduction, summary, or the following detailed description. As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

The subject matter described herein may be implemented in the context of any sort of sensing arrangement that is packaged, arranged or otherwise disposed within the interior of a vehicle and configured to sense, detect or otherwise quantify one or more characteristics of the environment within the vehicle interior. For purposes of explanation, the subject matter is described herein in the context of a radar (or radar system) that is packaged, arranged or otherwise disposed within the cabin or interior passenger compartment of an automotive vehicle to detect or otherwise identify the presence of a driver, passenger or other occupant of the vehicle. However, it should be appreciated that the subject matter described herein is not intended to be limited to any particular type of sensor or any particular type of vehicle, and may be implemented in an equivalent manner in the context of another type of sensor or sensing arrangement (e.g., lidar, cameras, photodetectors, optical sensors, image sensors, and/or the like) disposed within the cabin or an interior compartment of any other sort of vehicle, including, but not limited to aircraft, marine vessels, buses, trains, military vehicles and/or the like.

Figure 1:
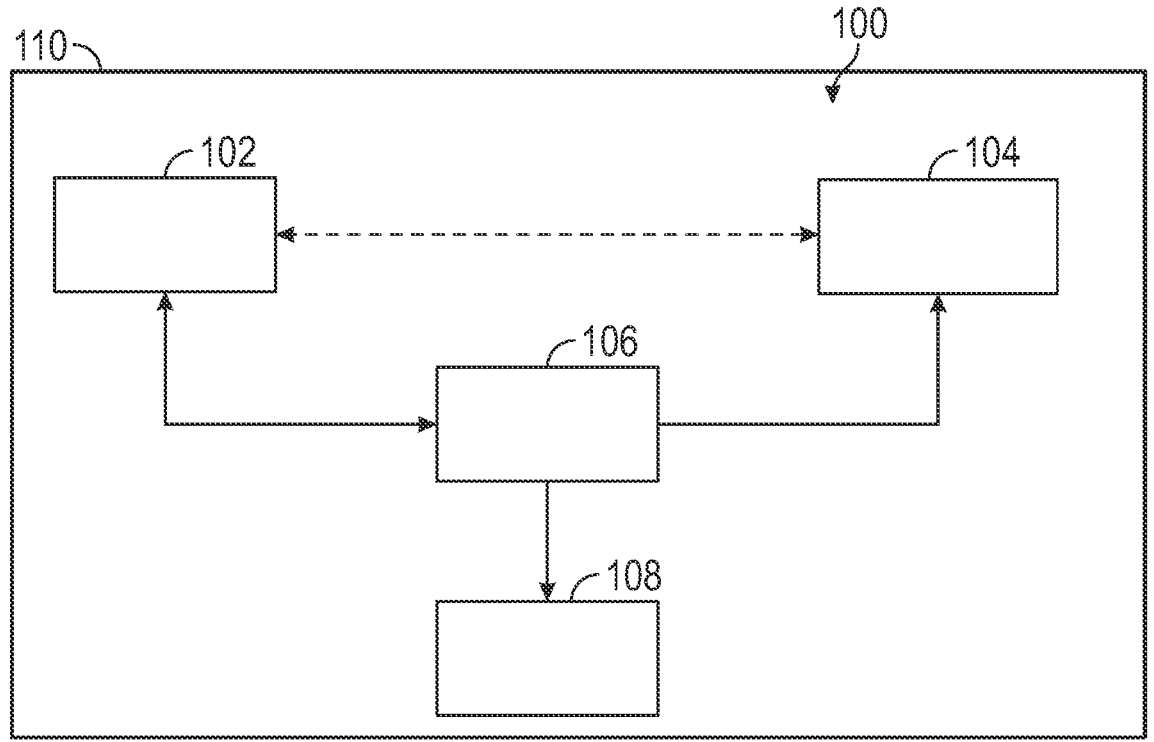
FIG. 1 is a block diagram illustrating a vehicle system in accordance with various implementations.

FIG. 1 depicts an exemplary system 100 that includes a radar 102 that is packaged, arranged or otherwise disposed within the interior passenger compartment or cabin of a vehicle 110 and configured to sense, detect or otherwise quantify the presence of one or more occupants within the interior cabin of the vehicle 110. In exemplary implementations, the radar 102 is communicatively coupled to a control module 106 associated with the vehicle 110. The control module 106 is communicatively coupled to one or more movable or actuatable components 104 that are similarly packaged, arranged or otherwise disposed within the interior passenger compartment or cabin of a vehicle 110, where the control module 106 is configurable to synchronize or otherwise coordinate operation of the interior components 104 and the radar 102 to calibrate the alignment of the radar 102.

In exemplary implementations, the interior components 104 are realized as any sort of component that is capable of being actuated, excited or otherwise operated in a manner that causes reflected electromagnetic waves to exhibit a Doppler effect or Doppler shift at the position of the radar 102. For example, in one or more implementations, the interior component(s) 104 utilized to calibrate the alignment of the radar 102 includes or is otherwise realized as an audio speaker or other transducer that converts an electrical signal into physical motion. That said, in other implementations, the interior component(s) 104 may include other electrically-actuatable mechanical devices (e.g., a seat equipped for power seating) or haptic devices (e.g., a seat massager) capable of producing a Doppler effect or Doppler shift. It should be noted that the subject matter described herein is not limited to any particular type or number of different interior components 104 that may be utilized to calibrate the alignment of the radar 102.

In exemplary implementations, the interior components 104 utilized to calibrate the alignment of the radar 102 are manufactured, packaged or otherwise disposed within the interior compartment of the vehicle 110 such that they have a substantially fixed or known spatial position and orientation that does not appreciably change or deviate over time during operation of the vehicle 110. For example, the audio speakers onboard the vehicle 110 may be fixedly mounted to the body, frame, dashboard or other structural feature of the vehicle 110 such that their position and orientation is maintained substantially constant throughout operation of the vehicle 110 over the lifetime of the vehicle 110. Similarly, an actuatable seat may be fixedly mounted to the chassis or other structural feature of the vehicle 110 to establish a known position and orientation for the actuatable seat in relation to the remainder of the interior passenger compartment.

The control module 106 generally represents an electronic control unit (ECU), body control module (BCM), vehicle control unit (VCU), controller or other electronic component onboard the vehicle 110 that includes at least one processor and data storage element that are cooperatively configurable to support the subject matter described herein. In this regard, the control module 106 may be realized as a system on a chip, integrated circuit or another electronics module. The processor can include or be realized as any custom made or commercially available processor, a central processing unit (CPU), a graphics processing unit (GPU), an auxiliary processor among several processors associated with the control module 106, a semiconductor-based microprocessor (in the form of a microchip or chip set), a macroprocessor, any combination thereof, or generally any device for executing instructions. The data storage element includes or is otherwise realized as a non-transitory computer readable storage device or media, which may include volatile and nonvolatile storage in read-only memory (ROM), random-access memory (RAM), and keep-alive memory (KAM), for example. KAM is a persistent or non-volatile memory that may be used to store various operating variables while the processor is powered down. The data storage element may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the processor. The instructions may include one or more separate programs, each of which comprises an ordered listing of executable instructions for implementing logical functions. The instructions, when executed by the processor, cause the processor to support or otherwise provide a calibration service and perform additional logic, calculations, methods and/or algorithms for supporting the subject matter described herein.

In exemplary implementations, the control module 106 is coupled to an output device 108, which generally represents a component associated with the vehicle 110 that is configurable to generate or otherwise provide user notifications, alerts or other output for a driver, passenger or other vehicle occupant in connection with the calibration processes described herein. For example, the output device 108 may be realized as an electronic display device that is located onboard the vehicle 110 or otherwise associated with another system onboard the vehicle 110, such as, for example, any sort of infotainment module, navigation head unit, or another similar or suitable unit that resides onboard the vehicle 110, and which may be integrated into a dash-board or other console within the interior passenger compartment of the vehicle 110. That said, in other implementations, the output device 108 may be realized as an electronic device associated with a vehicle owner or other user associated with the vehicle 110 that is separate and distinct from the vehicle 110 but communicatively coupled to the control module 106, such as, for example, a smartphone, a desktop computer, a mobile computer (e.g., a tablet computer, a laptop computer, or a netbook computer), a video game device, a digital media player, a piece of home entertainment equipment, a digital camera or video camera, a wearable computing device (e.g., smart watch, smart glasses, smart clothing), or the like.

Figure 2:
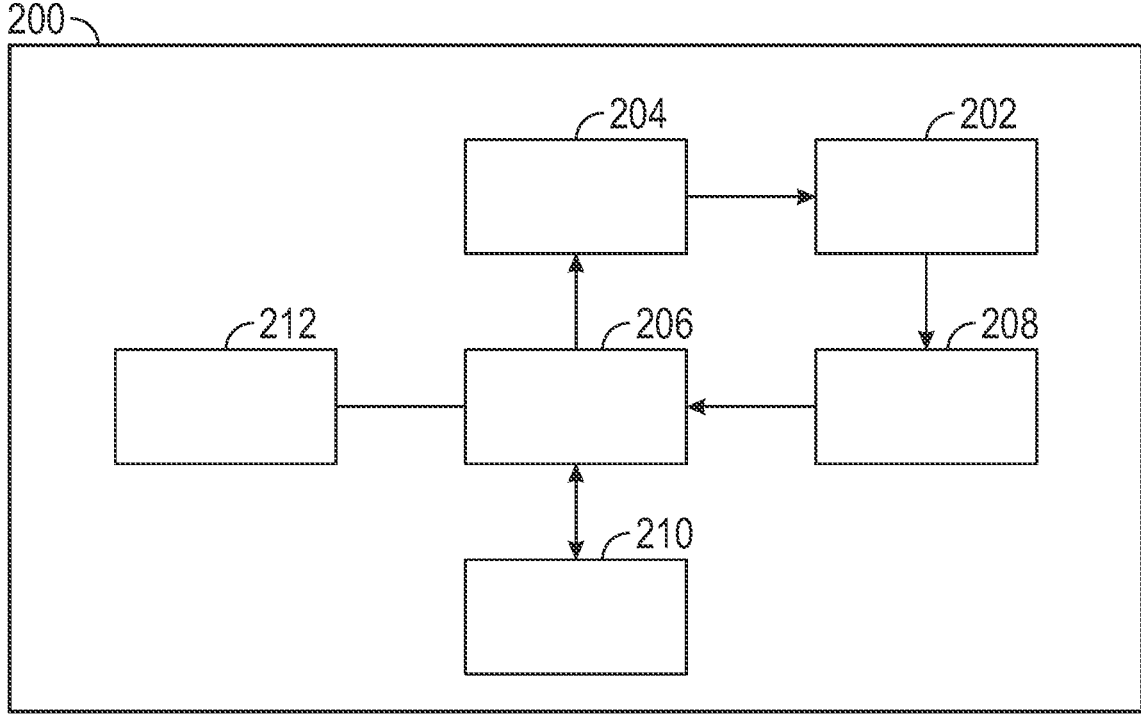
FIG. 2 is a block diagram illustrating a radar system suitable for use with a vehicle system in accordance with various implementations.

FIG. 2 depicts an exemplary implementation of a radar system 200 suitable for use as the radar 102 in the vehicle system 100 of FIG. 1. The radar system 200 includes one or more antennas 202 that are coupled to the output of a transmitter 204, which generally represents the circuitry, hardware, software, firmware, processing logic and/or other components that are configurable to generate excitation signals responsive to command signals from a control module 206 that cause the antenna(s) 202 to emit one or more electromagnetic waves into the interior passenger compartment or cabin of a vehicle. The radar system 200 also includes a receiver 208, which generally represents the circuitry, hardware, software, firmware, processing logic and/or other components that are coupled to the control module 206 to receive electromagnetic waves that are reflected back towards the antenna(s) 202 from one or more objects within the interior passenger compartment or cabin of the vehicle and provide electrical signals corresponding to the received reflected electromagnetic waves to the control module 206.

As described in greater detail below, based on the relationship between the received signals indicative of the reflected electromagnetic waves received at the antenna(s) 202 and the command signals indicative of the electromagnetic waves transmitted by the antenna(s) 202, the control module 206 can calculate or otherwise determine the distance (or range) and relative orientation (or azimuth or angle) between the position of the antenna(s) 202 and the detected objects within the interior passenger compartment of the vehicle. Based on the relationship between the Doppler effect exhibited by the reflected electromagnetic waves from a particular detected object and the known excitation or actuation of a respective component within the interior passenger compartment of the vehicle (e.g., interior component 104), the particular orientation and/or distance of that component in relation to the position of the antenna(s) 202 may be identified and compared to a desired reference orientation and/or distance for that interior component in relation to the antenna(s) 202. In this regard, the radar system 200 may include or otherwise access a data storage element 212 (or memory) that stores or otherwise maintains radar reference calibration data or other information identifying a target or reference spatial position and/or orientation of the antenna(s) 202 of the radar system 200 corresponding to the expected, designed or desired position and/or orientation of the antenna(s) 202, along with a target or reference distance and/or orientation corresponding to expected spatial position of each of the interior vehicle components capable of being utilized to calibrate the orientation and/or position of the antenna(s) 202 of the radar system 200 in relation to the expected or desired spatial position and/or orientation of the antenna(s) 202.

Based on the difference between the observed or detected orientation and/or distance associated with the interior component and the reference orientation and/or distance associated with the interior component maintained in the data storage element 212, the control module 206 may calculate or otherwise determine a calibration offset for a reference axis of the antenna(s) 202 to be applied to received signals from the receiver 208 to accurately position detected objects within the interior passenger compartment of the vehicle in relation to the current orientation and spatial position of the antenna(s) 202. In exemplary implementations, the calibration offset is utilized to determine the current orientation or alignment of the boresight associated with the antenna(s) 202 in relation to the targeted orientation or alignment for the antenna boresight. For example, the antenna boresight of the radar system 200 may be initially designed or configured to focus on a particular region of the interior passenger compartment, such as, for example, the driver's seat of the vehicle. As the orientation or the position of the antenna(s)

202 vary or shift over time, an alignment calibration process may be periodically performed to determine an updated calibration offset to allow the radar system 200 to continue to accurately detect the presence of a driver within the driver's seat or otherwise accurately position detected objects within the interior passenger compartment of the vehicle even though the orientation or spatial position of the radar system 200 deviates from its originally intended or expected alignment with respect to the interior passenger compartment.

In the illustrated implementation, the control module 206 is coupled to an input/output (I/O) interface 210 that generally represents the combination of hardware, software, firmware, processing logic and/or other components associated with the radar system 200 that is configured to support the control module 206 communicating with another vehicle controller (e.g., control module 106), for example, to receive synchronization signals or other indicia of excitation or actuation of the interior vehicle components being utilized to calibrate alignment of the radar system 200 and/or to provide indicia of the relative alignment or misalignment of the radar system 200 to the vehicle controller. For example, when the control module 206 determines that the difference between the observed or detected orientation and/or distance associated with the interior component and the reference orientation and/or distance associated with the interior component is greater than a maintenance threshold, the control module 206 may transmit or otherwise provide commands, instructions, signals or other indicia to the vehicle controller to cause the vehicle controller to generate one or more user notifications or alerts to a user associated with the vehicle using an output device (e.g., output device 108) to notify the user to schedule a service appointment for maintenance to correct or otherwise resolve misalignment of the radar system 200.

The control module 206 generally represents a processing system associated with the radar system 200 and generally includes at least one processor, which can include or be realized as any custom made or commercially available processor, a central processing unit (CPU), a graphics processing unit (GPU), an auxiliary processor, a semiconductor-based microprocessor (in the form of a microchip or chip set), a macroprocessor, any combination thereof, or generally any device for executing instructions.

The data storage element 212 generally represents the non-transitory computer readable storage device or media accessible to the control module 206, which may include volatile and nonvolatile storage in read-only memory (ROM), random-access memory (RAM), and keep-alive memory (KAM), for example. KAM is a persistent or non-volatile memory that may be used to store various operating variables while the control module 206 is powered down. The data storage element may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the control module 206. The instructions may include one or more separate programs, each of which comprises an ordered listing of executable instructions for implementing logical functions. The instructions, when executed by the control module 206, cause the control module 206 to support or otherwise provide a calibration service and perform additional logic, calculations, methods and/or algorithms for supporting the subject matter described herein.

Figure 3:
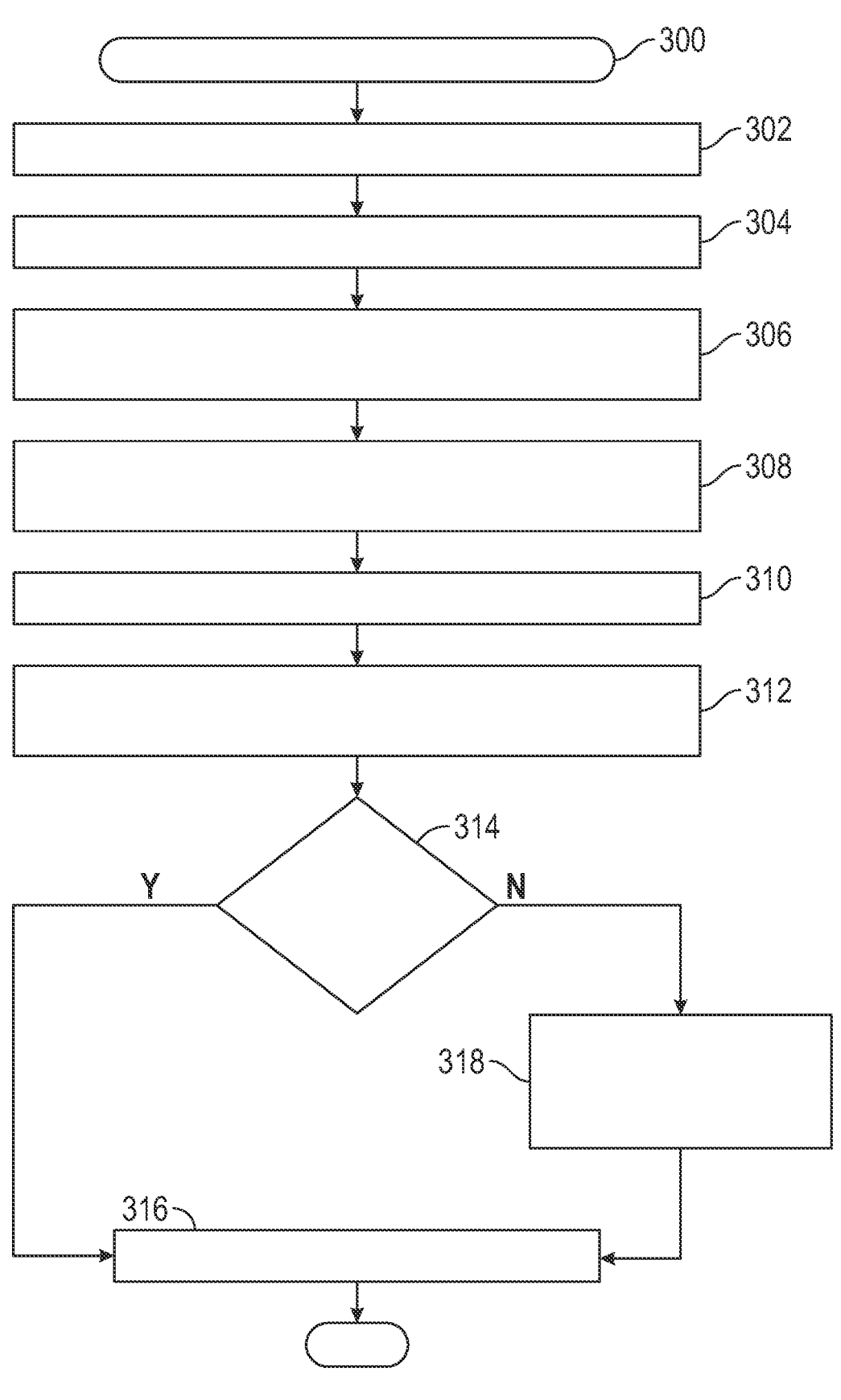
FIG. 3 depicts a flow diagram of a calibration process suitable for implementation in connection with the vehicle system of FIG. 1 according to one or more implementations described herein.

FIG. 3 depicts an exemplary calibration process 300 suitable for implementation by a control module associated with a vehicle, such as control module 106 or a control module 206 associated with a radar 102, 200, to determine a calibration offset for a sensing arrangement disposed within an interior of the vehicle using another interior component within the interior of the vehicle. For illustrative purposes, the following description may refer to elements mentioned above in connection with FIGS. 1-2. While portions of the calibration process 300 may be performed by different elements of a vehicle system, for purposes of explanation, the subject matter may be primarily described herein in the context of the calibration process 300 being primarily performed by a calibration service at a vehicle control module 106 and/or a radar control module 206.

Depending on the implementation, the calibration process 300 may be automatically initiated by a controller associated with a vehicle based on one or more triggering criteria. For example, in some implementations, a vehicle control module 106 may automatically initiate the calibration process 300 in response to receiving a command, signal or other indication from a test tool to initiate calibration at a manufacturing facility after assembly of the vehicle. That said, in other implementations, the vehicle control module 106 may automatically initiate the calibration process 300 in response to detecting a vehicle door opening event (e.g., a user opening one of the vehicle trunk, vehicle driver door, vehicle passenger door, etc.), a seat sensor event (e.g., detection of a user occupying or vacating the driver seat), a seat belt sensor event (e.g., detection of a driver seat belt, passenger seat belt or the like being engaged or disengaged) or another vehicle ingress event or a vehicle egress event indicative of a potential change in the occupancy of the vehicle. In yet other implementations, the vehicle control module 106 and/or a radar control module 206 may automatically initiate the calibration process 300 in response to determining an amount of time that has elapsed since a preceding iteration of the calibration process 300 is greater than a threshold amount of time between calibrations. In yet other implementations, the calibration process 300 may be automatically be initiated by a vehicle control module 106 in response to detecting any other sort of wakeup event for the vehicle, such as, for example, a fob proximity detection event (e.g., when a key fob, a cellular telephone, or other device capable of communicating proximity to the vehicle is within a threshold range of the vehicle), a remote command (e.g., remote start) or the like.

After determining the calibration process 300 should be initiated with respect to a particular sensing arrangement within the interior of the vehicle, in exemplary implementations, the vehicle controller initiates operation of one or more interior vehicle components at 302 and initiates generation of one or more calibration reference signals at 304 concurrent to the interior vehicle component operation to facilitate receiving or otherwise obtaining measurement signals from the sensing arrangement at 306, where one or more characteristics of the measurement signals received at the sensing arrangement are influenced by operation of the interior vehicle component(s). For example, in exemplary implementations where the sensing arrangement is realized as an in-cabin radar 102, 200, the vehicle control module 106 initiates operation of one or more interior vehicle components 104 that are capable of reflecting reference electromagnetic signals emitted by the radar 102, 200 back towards the radar 102, 200 that exhibit a Doppler effect, Doppler shift, or other distinguishable or unique radar signature that can be mapped to or otherwise associated with that particular interior vehicle component 104. Accordingly, the vehicle control module 106 and/or the radar control module 206 may utilize the radar signature exhibited within reflected electromagnetic signals to identify the presence of a particular interior component 104 within the reflected electromagnetic signals (e.g., based on a Doppler frequency shift in the reflected electromagnetic signals corresponding to the actuation or operation of that particular interior component 104). It should be noted that the subject matter described herein is not limited to any particular type, number or combination of interior vehicle components that may be utilized to support the calibration process 300, nor is the subject matter described herein limited to any particular sequence or order of operating the interior vehicle components, which may be operated sequentially or concurrently.

In one implementation, where the interior vehicle component 104 is realized as an in-cabin audio speaker, the control module 106 initiates operation of the audio speaker to play a particular frequency or a sequence or pattern of different frequencies that cause physical movement of the cone of the speaker, which, in turn, influences the frequency or other characteristics of the electromagnetic signals emitted by the radar 102, 200 that are reflected back towards the radar 102, 200 by the speaker. Additionally or alternatively, where the interior vehicle component 104 is realized as a vehicle seat equipped with power seating functionality, the control module 106 initiates a power seating adjustment of the vehicle seat to cause physical movement of the vehicle seat in relation to the radar 102, 200 and increase and/or decrease the exposed amount of the metallic rails or base of the vehicle seat. Movement of the vehicle seat may result in a Doppler effect or Doppler shift in the electromagnetic signals reflected by the vehicle seat, while the metallic rails or base provides a highly reflective object with a fixed distance and orientation to provide a distinguishable radar signature associated with the vehicle seat. In a similar manner, when the interior vehicle component 104 is realized as a vehicle seat equipped with a haptic device or other haptic feedback functionality, the control module 106 initiates operation of the haptic device with a particular frequency or a sequence or pattern of different frequencies that causes physical movement or vibration that produces a distinguishable radar signature in the reflected electromagnetic signals that can be mapped back to the haptic device.

In implementations where the calibration process 300 is initiated or implemented by the vehicle control module 106, the vehicle control module 106 may provide one more commands or signals to the radar 102 and the interior component(s) 104 to synchronize or otherwise coordinate operation of the interior component(s) 104 and the radar 102 such that the radar 102 generates, transmits or otherwise emits the reference electromagnetic signals concurrent to operation of the interior component(s) 104 to ensure the reflected electromagnetic signals received at the radar 102 exhibit the radar signature associated with the interior component(s) 104. For example, in some implementations, the radar 102 and interior component(s) 104 may be communicatively coupled to the control module 106 via a common bus (e.g., a controller area network (CAN) bus) or other network that allows the control module 106 to provide a synchronization command or signal that is received by both the radar 102 and interior component(s) 104 at substantially the same time. That said, in other implementations, where the calibration process 300 is initiated or implemented, in whole or in part, by the radar system 200 and/or the radar control module 206, the radar control module 206 may communicate with the vehicle control module 106 to coordinate operation of the interior vehicle component(s) 104 with the operation of the radar system 200.

Still referring to FIG. 3, in exemplary implementations, the calibration process 300 calculates or otherwise determines a measured position for a respective interior vehicle component based on one or more characteristics of the obtained measurement signals at 308. In this regard, using the expected Doppler shift or other unique or distinguishable radar signature associated with the particular interior vehicle component 104 that was operated or actuated at 302, the vehicle control module 106 and/or the radar control module 206 may analyze the reflected electromagnetic signals to identify the presence of the interior vehicle component 104 within the reflected electromagnetic signals. Based on the location of the radar signature associated with the interior vehicle component 104 within the reflected electromagnetic signals, the vehicle control module 106 and/or the radar control module 206 calculates or otherwise determines the measured distance (or range) and the measured orientation (pitch and azimuth angles) of the interior vehicle component 104 relative to the antenna boresight or other reference axis associated with the radar 102, 200.

The calibration process 300 identifies or otherwise obtains an expected reference position for the respective interior vehicle component corresponding to the expected or targeted position and orientation for the sensing arrangement at 310 and then calculates or otherwise determines a calibration offset corresponding to the current position and orientation of the sensing arrangement based on the difference between the measured position of that interior vehicle component and its expected reference position at 312. For example, the vehicle control module 106 and/or the radar control module 206 may read, query or otherwise access a data storage (e.g., data storage element 212) that maintains calibration data for a radar 102, 200 that identifies the expected distance (or range) and the expected orientation (or azimuth or angle) for the different actuatable interior vehicle components 104 in relation to the antenna boresight or other reference axis associated with the radar 102, 200. Based on the difference between the measured orientation and the expected orientation associated with a particular interior vehicle component 104, the vehicle control module 106 and/or the radar control module 206 calculates or otherwise determines a calibration offset that represents an amount by which the reference axis or antenna boresight of the radar 102, 200 deviates from its expected alignment using the difference between the measured and expected distances to the particular interior vehicle component 104. In this regard, in implementations where multiple different interior vehicle components are operated at 302, the calibration process 300 may calculate a respective calibration offset for each different interior vehicle component and then average the different calibration offset values to arrive at an average calibration offset value.

In exemplary implementations, the calibration process 300 compares the calibration offset indicative of the current alignment of the sensing arrangement to a maintenance threshold at 314 to verify or otherwise confirm the current alignment of the sensing arrangement is within a tolerable amount of deviation from the targeted or expected reference alignment for the sensing arrangement. In this regard, when the calibration offset is greater than the maintenance threshold, the calibration process 300 automatically generates one or more user notifications at 316 to notify the user that maintenance or service is required to correct alignment of the sensing arrangement. Thus, when the antenna boresight or other reference axis associated with the radar 102, 200 deviates from its intended alignment or orientation by an amount that limits the field of view of the radar 102, 200 with respect to the region of the interior passenger compartment of the vehicle that the radar 102, 200 is intended to survey or analyze, the calibration process 300 may automatically initiate generation of a user notification that alerts the driver or other operator of the vehicle of a potential issue associated with the radar 102, 200 (e.g., by illuminating one or more dashboard indicators), so that a user may schedule service or initiate another remedial action (e.g., verifying the radar 102, 200 is not covered or obstructed by another object) to restore normal operation of the radar 102, 200.

On the other hand, when the calibration offset is less than the maintenance threshold, the calibration process 300 utilizes the calibration threshold at 318 to detect and determine the presence of one or more occupants or other objects within the interior of the vehicle and provide corresponding user notifications. For example, in a similar manner as described above at 308, after calibrating an offset to be applied to compensate for a deviation in the alignment of the radar 102, 200, the vehicle control module 106 and/or the radar control module 206 may operate the radar 102, 200 to generate, transmit or otherwise emit electromagnetic signals concurrent and receive corresponding reflected electromagnetic signals which may exhibit different radar signatures indicative of presence (or absence) of vehicle occupants. For a particular observed radar signature distinguishable as a particular object, the vehicle control module 106 and/or the radar control module 206 calculates or otherwise determines the measured distance (or range) and the measured orientation (or azimuth or angle) of the detected object relative to the current antenna boresight or other reference axis associated with the radar 102, 200 before applying the calibrated offset to the measured position to arrive at a calibrated detected position for a particular object within the interior passenger compartment of the vehicle. When the calibrated detected position corresponds to the driver's seat or another discrete location within the interior passenger compartment and the radar signature of the detected object corresponds to a human adult, the vehicle control module 106 and/or the radar control module 206 may detect or otherwise identify the presence of a driver and initiated or otherwise perform one or more actions that result in a corresponding user notification influenced by the detected object (e.g., activating or enabling a driver's side airbag and providing a corresponding indication, illuminating a fasten seat belt light, and/or the like). It should be noted that there are various different types of user notifications that may be provided based on the detected object position, and various different display criteria or notification criteria that may be utilized on concert with the detected presence, absence or location of an object, and the subject matter is not limited to any particular type, number or combination of user notifications that may be influenced by the calibrated offset.

Figure 4:
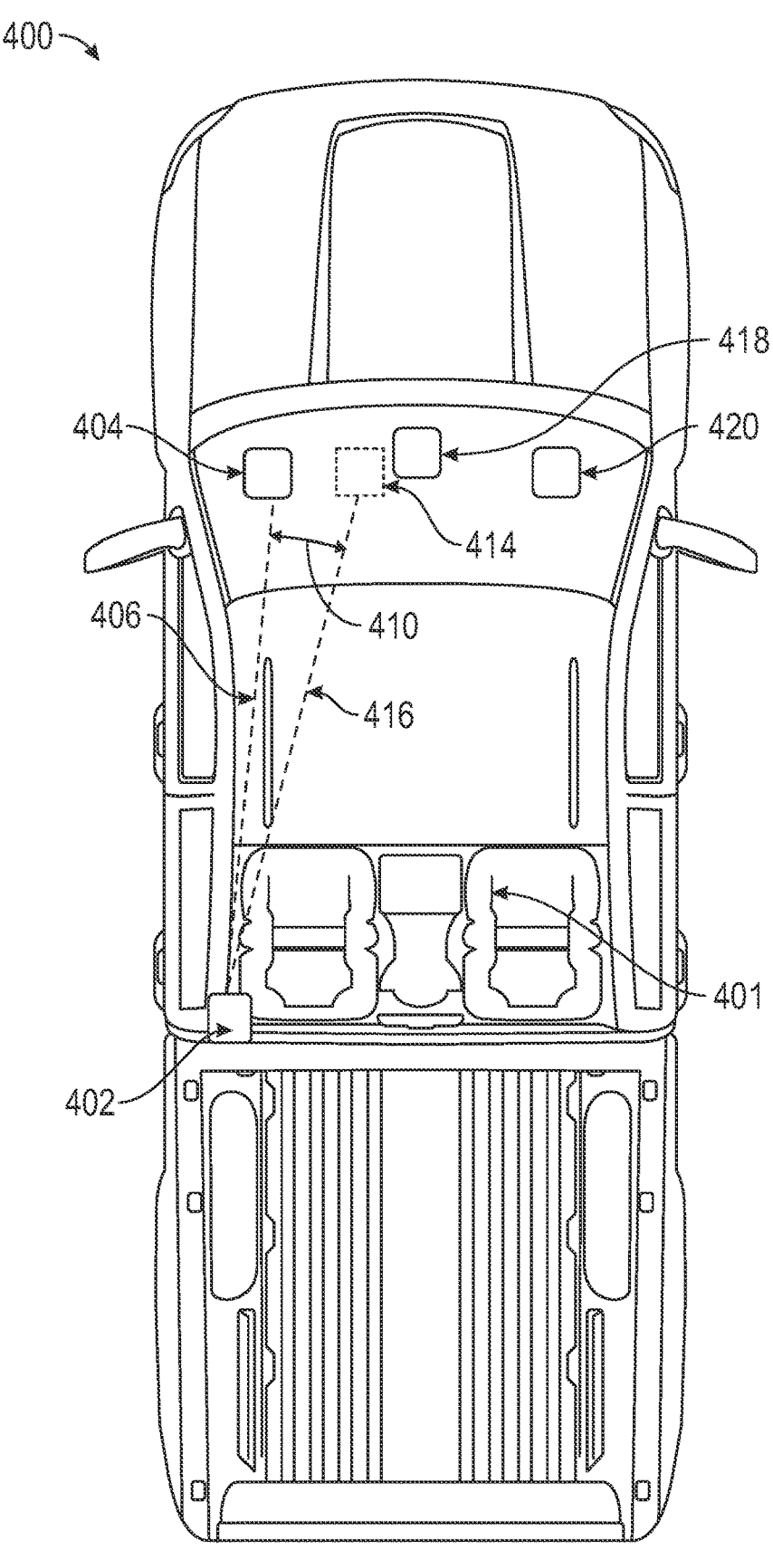
FIG. 4 is a schematic illustrating a vehicle including an in-cabin radar suitable for calibration in accordance with the calibration process of FIG. 3 in accordance with various implementations.

FIG. 4 depicts an exemplary implementation of a vehicle 400 including a radar 402 mounted or packaged on the interior of the C pillar of the interior passenger compartment 401 suitable for calibration with an interior audio speaker 404 using the calibration process 300 of FIG. 3. The vehicle control module 106 and/or the radar control module 206 initiates operation of the speaker 404 within the interior passenger compartment of the vehicle concurrently to operating the radar 402 to emit calibration reference electromagnetic signals within the interior passenger compartment 401, where operation of the speaker 404 produces a Doppler shift or other radar signature within the reflected electromagnetic signals received at the radar 402. In response to identifying the observed radar signature within the reflected electromagnetic signals corresponding to the audio speaker 404, the vehicle control module 106 and/or the radar control module 206 obtains the expected reference position for the audio speaker 404 that defines an expected orientation for an axis 406 aligned between the radar 402 and the audio speaker 404. The vehicle control module 106 and/or the radar control module 206 calculates or otherwise determines a measured position 414 for the audio speaker 404 that defines an observed orientation for an axis 416 aligned between the radar 402 and the audio speaker 404.

Based on the difference 410 between the observed orientation axis 416 and the expected orientation axis 406, the vehicle control module 106 and/or the radar control module 206 calculates or otherwise determines a calibration offset value to be applied to measured positions of subsequently detected objects to compensate for the calibrated or observed deviation in the antenna boresight axis from the expected orientation axis 406 to the measured orientation axis 416. Subsequently applying the calibration offset value allows for measured object positions determined using the current orientation or alignment of the radar 402 to be converted to calibrated positions with respect to the interior passenger compartment 401 and the known position where the audio speaker 404 is packaged or installed within the vehicle 400. As described above, when the difference or deviation 410 between an expected orientation axis 406 and the observed current orientation axis 416 for the vehicle 400 is greater than a threshold, the vehicle control module 106 and/or the radar control module 206 may automatically generate a user notification that the radar 402 requires maintenance or other attention and automatically disable subsequent operation of the radar 402 (e.g., to prevent false positive or false negatives due to misalignment).

It should be noted that FIG. 4 depicts an implementation with three interior audio speakers 404, 418, 420 (e.g., left, right and center), where in such implementations, the calibration process 300 may be performed to determine a respective calibration offset value for each of the audio speakers 404, 418, 420, which, in turn, may be averaged to arrive at an averaged calibration offset value to be applied to subsequent radar returns. In this regard, in implementations where additional and/or different types of actuatable interior components are present (e.g., power seating, haptic devices and/or the like), the respective calibration offset value for each of the interior components may be averaged or otherwise combined to improve the accuracy and/or reliability of the offset value. It should be noted that although FIG. 4 depicts a two-dimensional implementation, in practice, the calibration offset value may be realized as a vector or other representation to encompass three different orientation axes (e.g., roll, pitch and yaw) and/or three different translation axes to provide calibration of the radar for six degrees of freedom applications.

For sake of brevity, conventional techniques related to radar, sensors, driver assistance features, autonomous vehicles, and other functional aspects of the systems (and the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in an implementation of the subject matter.

As used herein, the word "exemplary" means "serving as an example, instance, or illustration." Thus, any implementation described herein as "exemplary" is not necessarily to be construed as preferred or advantageous over other implementations. All of the implementations described herein are exemplary implementations provided to enable persons skilled in the art to make or use the invention and not to limit the scope of the invention which is defined by the claims.

Those of skill in the art will appreciate that the various illustrative logical blocks, modules, circuits, and algorithm steps described in connection with the implementations disclosed herein may be implemented as electronic hardware, computer software, or combinations of both. Some of the implementations are described above in terms of functional and/or logical block components (or modules) and various processing steps. However, it should be appreciated that such block components (or modules) may be realized by any number of hardware, software, and/or firmware components configured to perform the specified functions. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

When implemented in software or firmware, various elements of the systems described herein are essentially the code segments or instructions that perform the various tasks. The program or code segments can be stored in a processor-readable medium or transmitted by a computer data signal embodied in a carrier wave over a transmission medium or communication path. The "computer-readable medium", "processor-readable medium", or "machine-readable medium" may include any medium that can store or transfer information. Examples of the processor-readable medium include an electronic circuit, a semiconductor memory device, a ROM, a flash memory, an erasable ROM (EROM), a floppy diskette, a CD-ROM, an optical disk, a hard disk, a fiber optic medium, a radio frequency (RF) link, or the like. The computer data signal may include any signal that can propagate over a transmission medium such as electronic network channels, optical fibers, air, electromagnetic paths, or RF links. The code segments may be downloaded via computer networks such as the Internet, an intranet, a LAN, or the like.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is logically coherent.

Furthermore, the foregoing description may refer to elements or nodes or features being "coupled" together. As used herein, unless expressly stated otherwise, "coupled" means that one element/node/feature is directly or indirectly joined to (or directly or indirectly communicates with) another element/node/feature, and not necessarily mechanically. For example, two elements may be coupled to each other physically, electronically, logically, or in any other manner, through one or more additional elements. Thus, although the drawings may depict one exemplary arrangement of elements directly connected to one another, additional intervening elements, devices, features, or components may be present in an implementation of the depicted subject matter. In addition, certain terminology may also be used herein for the purpose of reference only, and thus are not intended to be limiting.

While at least one exemplary aspect has been presented in the foregoing detailed description, it should be appreciated that a vast number of variations exist. It should also be appreciated that the exemplary aspect or exemplary aspects are only examples, and are not intended to limit the scope, applicability, or configuration of the disclosure in any way. Rather, the foregoing detailed description will provide those skilled in the art with a convenient road map for implementing the exemplary aspect or exemplary aspects. It should be understood that various changes can be made in the function and arrangement of elements without departing from the scope of the disclosure as set forth in the appended claims and the legal equivalents thereof.

What is claimed is:

1. A method of assisting operation of a vehicle using a radar within an interior compartment of the vehicle, the method comprising:

initiating, by a control module associated with the vehicle, operation of an interior component of the vehicle;

receiving one or more reflected electromagnetic signals with the radar, wherein the operation of the interior component produces a Doppler shift in the one or more reflected electromagnetic signals;

obtaining, by the control module, the one or more reflected electromagnetic signals from the radar within the interior compartment of the vehicle, wherein a frequency of the one or more reflected electromagnetic signals is influenced by the operation of the interior component;

determining, by the control module, a measured position of the interior component based at least in part on the frequency of the one or more reflected electromagnetic signals;

obtaining, by the control module, a reference position associated with the interior component; and determining, by the control module, a calibration offset for a reference axis associated with the radar based on a relationship between the measured position and the reference position and applying the calibration offset to modify at least one vehicle control function during subsequent operation.

2. The method of claim 1, further comprising initiating transmission of one or more reference electromagnetic signals by the radar concurrent to the operation of the interior component.

3. The method of claim 2, wherein the reference axis comprises an antenna boresight associated with the radar and wherein the calibration offset represents an amount by which the antenna boresight deviates from an expected alignment.

4. The method of claim 2, wherein obtaining the one or more reflected electromagnetic signals comprises detecting a Doppler frequency shift in electromagnetic signals reflected by the interior component, wherein the Doppler frequency shift corresponds to the operation of the interior component.

5. The method of claim 4, wherein the Doppler frequency shift has a magnitude corresponding to a velocity of physical movement of the interior component, and wherein the measured position is determined based on both the Doppler frequency shift and a time delay of the reflected electromagnetic signals.

6. The method of claim 4, further comprising determining an identification of the interior component based on the one or more reflected electromagnetic signals, wherein obtaining the reference position comprises obtaining the reference position associated with the identification of the interior component from a data storage element, and wherein the identification is based on a unique radar signature associated with the interior component.

7. The method of claim 4, wherein initiating the operation of the interior component comprises initiating operation of an audio speaker within an interior passenger compartment of the vehicle to play a particular frequency or sequence of frequencies that causes physical movement of a cone of the audio speaker.

8. The method of claim 4, wherein initiating the operation of the interior component comprises initiating a power seating adjustment of a seat within an interior passenger compartment of the vehicle to cause physical movement of the seat and change an exposed amount of metallic rails of the seat.

9. The method of claim 4, wherein initiating the operation of the interior component comprises initiating operation of a haptic device within an interior passenger compartment of the vehicle with a particular frequency or pattern of frequencies that produces a distinguishable radar signature.

10. The method of claim 1, wherein the subsequent operation of the vehicle comprises the control module generating a user notification in a manner that is influenced by the calibration offset associated with the radar, and wherein the user notification comprises an indication of a detected occupant position within the interior compartment that is adjusted based on the calibration offset.

11. A non-transitory computer-readable medium comprising executable instructions that, when executed by a processor, cause the processor to provide a calibration service configurable to:
   initiate operation of an interior component of a vehicle;
   obtain one or more signals from a sensing arrangement within an interior compartment of the vehicle, wherein a characteristic of the one or more signals is influenced by the operation of the interior component;
   determine a measured position of the interior component based at least in part on the characteristic of the one or more signals;

16 obtain a reference position associated with the interior component;
   determine a calibration offset for a reference axis associated with the sensing arrangement based on a relationship between the measured position and the reference position; and
   compare the calibration offset to a maintenance threshold and generate a user notification based on the calibration offset when the calibration offset exceeds the maintenance threshold to indicate a need for maintenance of the sensing arrangement.

12. The non-transitory computer-readable medium of claim 11, wherein the sensing arrangement comprises a radar, wherein the reference axis comprises an antenna boresight associated with the radar, and wherein the calibration service is further configurable to synchronize operation of the interior component with transmission of electromagnetic signals by the radar.

13. The non-transitory computer-readable medium of claim 12, wherein the calibration service is configurable to initiate transmission of one or more reference electromagnetic signals by the radar, wherein obtaining the one or more signals comprises obtaining one or more reflected electromagnetic signals from the radar responsive to the interior component reflecting the one or more reference electromagnetic signals, wherein the characteristic comprises a frequency of the one or more reflected electromagnetic signals, and wherein the interior component has a fixed spatial position within the interior compartment.

14. The non-transitory computer-readable medium of claim 13, wherein the operation of the interior component produces a Doppler shift in the one or more reflected electromagnetic signals that is distinguishable from reflected signals from other objects within the interior compartment.

15. The non-transitory computer-readable medium of claim 13, wherein the interior component comprises an audio speaker within an interior passenger compartment of the vehicle, and wherein the calibration service is configurable to command the audio speaker to operate at one or more specific frequencies.

16. The non-transitory computer-readable medium of claim 13, wherein initiating the operation of the interior component comprises initiating a power seating adjustment of a seat within an interior passenger compartment of the vehicle, and wherein the power seating adjustment changes a radar cross-section of the seat.

17. The non-transitory computer-readable medium of claim 13, wherein initiating the operation of the interior component comprises initiating operation of a haptic device within an interior passenger compartment of the vehicle, and wherein the haptic device operation creates vibration detectable by the radar.

* * * * *